United States Patent [19]
Rakhovsky et al.

[11] 3,883,248
[45] May 13, 1975

[54] METHOD AND APPARATUS FOR MEASURING CONCENTRATION OF SUBSTANCE IN ITS GASEOUS PHASE

[76] Inventors: Vadim Izrailovich Rakhovsky, ulitsa Mashinostroenia, 2/7, korpus 1, kv. 68; Gennady Izrailovich Stotsky, bulvar generala Karbysheva, 22, kv. 50; Maria Andreevna Mazing, ulitsa Kerchinskaya, 32, kv. 37, all of Moscow; Valery Mikhailovich Shustryakov, MFTI, korpus 7, kv. 413, Dolgoprudny Moskovskoi Oblasti, all of U.S.S.R.

[22] Filed: Aug. 31, 1972

[21] Appl. No.: 285,194

[30] Foreign Application Priority Data
June 13, 1972 U.S.S.R............................. 1797587
June 13, 1972 U.S.S.R............................. 1797588

[52] U.S. Cl. ............................... 356/85; 356/97
[51] Int. Cl. ............................................ G01j 3/42
[58] Field of Search............... 356/74, 96, 97, 85–87

[56] References Cited
UNITED STATES PATENTS
3,386,331   6/1968   Keller............................ 356/87 UX

OTHER PUBLICATIONS
Jackson et al., Proceedings of the Royal Society of London, Series A, Vol. 148, No. 864, Feb. 1, 1935, pp. 335–352.
Tolansky, S., High Resolution Spectroscopy, New York, Pitman Publishing Corporation, 1947, pp. 71–85.

Primary Examiner—Ronald L. Wibert
Assistant Examiner—F. L. Evans
Attorney, Agent, or Firm—Holman & Stern

[57] ABSTRACT

A method of measuring the concentration of a substance in its gaseous phase, based on passing of a luminous flux emitted by a source of light through a target containing the substance being measured in its gaseous phase, disposed in the target as a periodically interrupted atomic beam, absorbing by the atomic beam a portion of radiation emitted by the luminous flux each time the atomic beam interferes with the flux, which leads to generating an alternating component of the luminous flux, isolating a section of the radiation spectrum including the whole absorption line of the substance involved and converting the luminous flux into corresponding electric signal, repeatedly storing of the alternating component of the electric signal in synchronism with the interruption of the atomic beam, increasing thereby the portion of useful signal in noise and automatically determining the ratio of stored a.c. component of the electric signal to a signal corresponding to the luminous flux passed through the target without being absorbed, proportional to the concentration of the substance being measured in its gaseous phase. An apparatus embodying the above-described method comprising a source of light, said target the luminous flux emitted by which passes successively through a target, made as a vacuum chamber provided with a system of collimating diaphragms for forming the atomic beam from the gaseous phase of the substance involved and a means for interrupting the atomic beam, a spectral instrument for isolating from the radiation spectrum of the source a section comparable with the atomic beam absorption line, a photo detector and a storage circuit making possible to increase the portion of useful signal in noise.

10 Claims, 5 Drawing Figures

METHOD AND APPARATUS FOR MEASURING CONCENTRATION OF SUBSTANCE IN ITS GASEOUS PHASE

BACKGROUND OF THE INVENTION

The present invention relates generally to methods and apparatuses for determining the quantity of a substance employing spectrum analysis, and in particular to a method for measuring the concentration of the substance in its gaseous phase and an apparatus for effecting same.

The invention can be found useful in designing an instrument for determining micron admixtures in a variety of substances.

From the various known methods of determining the substance quantity, those based on spectrum analysis are most sensitive. Therefore, their use is widespread in diverse arts involving the analysis of the substance microquantity.

A method of measuring the concentration of a substance in its gaseous phase is known, based on passing the luminous flux emitted by the source of light through a target containing the substance involved in its gaseous phase, absorbing a portion of radiation of said source of light by the substance involved and its passage without being absorbed, further isolating a section from the radiation spectrum and converting a luminous flux corresponding to it into an electric signal.

Known devices embodying said method comprises a source of light, the luminous flux emitted therefrom passes in succession through a target containing the substance involved in its gaseous phase, a means for isolating from the luminous flux a section of the radiation spectrum of the source of light and a photo detector converting the luminous flux of the isolated section of the radiation spectrum into an electric signal applied to a recorder.

In such devices a dish or flame is used as a target, the substance being evaporated in order to measure its concentration, the atoms of the substance involved absorbing a portion of the radiation emitted by the source of light.

By the optical density, i.e. a log of a ratio between the intensity of monochromatic luminous flux incident onto and passed through the substance involved in its gaseous phase, which occupies a certain volume in the flame or dish and the concentration of atoms in the absorption layer of this substance is determined.

Such a method of determining the concentration calls for fulfilling a number of special requirements, such as compliance of the maximum of radiation line of the source of light to that of absorption line of the substance involved; the radiation line should be considerably narrower than that of the substance involved, while the absorption line contour should be governed by Doppler and Lorentz effects only.

In practice, none of the above requirements can be met when measurements are taken in a dish or flame. Therefore, the above described devices have to be calibrated beforehand according to reference samples in order to convert measured optical densisties of substances involved to their concentrations.

The minimal value of concentration of atoms in the gaseous phase of the substance involved which can be measured using the above method is restricted by a limiting value of optical density and the minimal width of the absorption line obtained when the method is realized in the above mentioned device.

In order to obtain a linear dependence of the optical density on the concentration of the substance involved, the absorption line of the latter is intentionally widened with an excess pressure of a foreign gas supplied into the dish or flame, which introduces large errors into the results of the concentration measurement.

The limiting value of the optical density obtained in effecting the above method depends on fluctuations of the luminous flux directed from the source of light to the photo detector, and on noises in the photo detector and a recorder. When the absorption layers are used, large fluctuations of the luminous flux are registered in the flame or dish due to the overlapping of the continuous background radiation of the absorption layer onto the line radiation spectrum of the source of light used in the hereinabove device, which prevent small signal-to-noise ratios (less than 1 percent) from being measured.

SUMMARY OF THE INVENTION

It is an object of the present invention to provide a method and an apparatus for measuring the concentration of a substance in its gaseous phase, increasing the sensitivity and accuracy in measurements of the concentration of atoms in a gaseous phase of the substance involved, which do not require the calibration according to reference samples.

This object is attained in that in a method for measuring the concentration of a substance in its gaseous phase, based on passing the luminous flux emitted by a source of light through a target containing the substance being measured in its gaseous phase, absorbing by the substance a portion of radiation of the source of light and the passage of said radiation without being absorbed, isolation of the radiation spectrum section and converting the luminous flux corresponding to it into an electrical signal. According to the invention, the substance involved is disposed in the target in the form of a periodically interrupted atomic beam. A portion of radiation emitted by a luminous flux passing continuously through the target is absorbed each time said atomic beam appears on the path of said flux, which leads to the appearance of an alternating component of the luminous flux. A radiation spectrum section is isolated which includes the whole absorption line of the substance involved, and the alternating component of the electric signal is simultaneously accumulated in synchronism with the interruption of the atomic beam, thus increasing the portion of useful signal in noise. The ratio of the stored alternating component of the electric signal to the signal corresponding to the luminous flux passed through the target without being absorbed is determined, said flux being proportional to the concentration of the substance involved in its gaseous phase.

Before passing the luminous flux through the atomic beam, it is expedient to excite the atoms of the latter in order to measure the concentration of the substance having a complex absorption spectrum in the non-excited state.

It is advantageous to construct an apparatus for measuring the concentration of a substance in its gaseous phase, comprising a source of light, the luminous flux whereof passes successively through a target containing the substance involved in its gaseous phase, a device for isolating a radiation spectrum section from the luminous flux of the source of light and a photo detector converting the luminous flux of the isolated section of the radiation spectrum into an electrical signal applied to a recorder, wherein, according to the invention, the target is made as a vacuum chamber, comprising a system of collimating diaphragms for shaping the atomic beam from the gaseous phase of the substance involved and having a means for interrupting the atomic beam in the vacuum chamber disposed in relation to said chamber so that the interruption of the atomic beam is ensured, while the means for isolating the luminous flux section from the radiation spectrum is made as a spectral instrument ensuring the isolation of a section from the radiation spectrum of the light source comparable with the absorption line of the atomic base, a storage circuit being included between the photo detector and recorder electrically coupled with the latter in order to increase the portion of useful signal in noise.

Another embodiment of the apparatus may include a storage circuit having a synchronous detector and a synchronizer electrically coupled with the photo detector and included between another input of the detector and a means for interrupting the atomic beam.

Yet another embodiment of the apparatus may also incorporate a spectral instrument having a multiple-wave interferometer comprised of two parallel half-silvered mirrors and a monochromator placed on the path of the luminous flux.

Yet another embodiment of the apparatus is wherein a multiple-wave interferometer is housed inside the vacuum chamber, its half-silvered mirrors being arranged nearly parallel to the axis of the atomic beam, the mirrors being inside said chamber and embrace the beam.

Embodiment is wherein for the absorption lines of substance being investigated having an isotopic structure, the light source having a line radiation spectrum of an even isotope of the substance being studied, which is disposed inside said source of light.

This invention makes it possible to increase considerably the sensitivity of measurements of the concentration of the substance involved in its gaseous phase and to improve the accuracy of measurements. Thus no preliminary calibration with reference samples is necessary.

BRIEF DESCRIPTION OF THE DRAWINGS

The invention will now be explained in greater detail with reference to an embodiment thereof, which is represented in the accompanying drawings wherein.

DESCRIPTION OF THE PREFERRED EMBODIMENT

An apparatus for measuring the concentration of a substance in its gaseous phase according to the invention comprises a source of light 1 (FIG. 1) with a line spectrum of radiation from an even isotope of cadmium ($Cd^{114}$), which is necessary for measuring the concentration of $Cd$, the absorption line thereof having a complex isotope structure. The source of light is a ball lamp filled with an inert gas and containing several milligrams of $Cd^{114}$. A high-frequency electrodeless discharge is generated in the lamp with the help of a h.f. generator (not shown in the Figure). The luminous flux 2 emitted by the lamp (shown in the Figure by a thick line) is collected by a biconvex lens 3 so disposed as to make the source of light 1 be imaged on the axis of the atomic beam 4. The latter is formed in a vacuum chamber 5.

Figure 1:
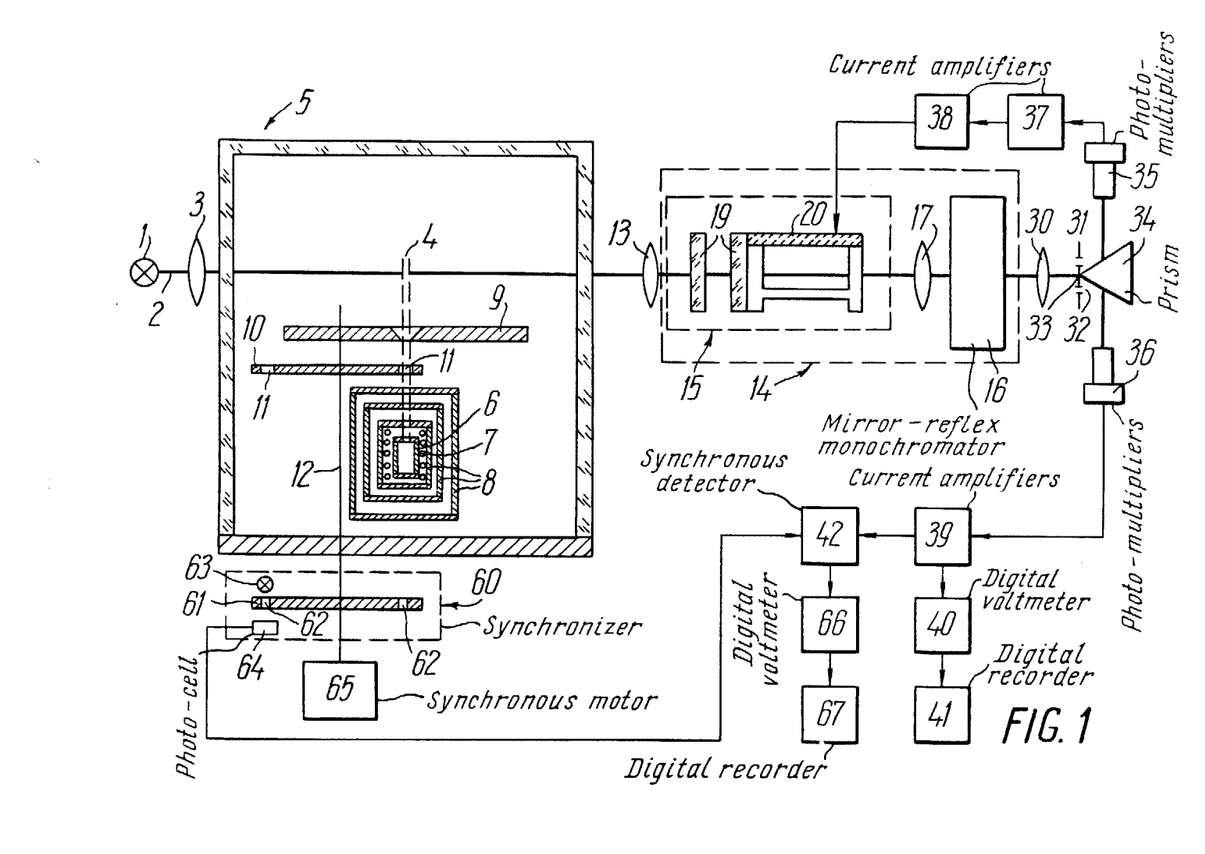
FIG. 1 is a schematic circuit diagram illustrating an embodiment of the first version of the apparatus for measuring the concentration of a substance in its gaseous phase, according to the invention.

The vacuum chamber 5 includes a metallic effusion cell 6 around which an electric heating spiral 7 is wound, and surrounded by three metal thermal shields 8. The effusion cell 6 and each of the shields 8 are provided with a hole which performs along with a diaphragm 9 installed in the chamber 5, the function of collimating diaphragms providing a required aperture of the atomic beam 4.

The vacuum chamber 5 is also provided with a pumping out means (not shown in the Figure) and a device for interrupting the atomic beam 4 made in the embodiment hereinabove described as a disc 10 with a plurality of holes 11 arranged along its circumference, the number of holes being is associated with the interruption frequency of the atomic beam 4. The disc 10 is fitted on a shaft 12 between the diaphragm 9 and the upper thermal shield 8 so that the atomic beam 4 can freely pass through its holes 11.

Beyond the chamber 5, in the path of the luminous flux 2, an objective lens 13 is disposed, whose focal plane is arranged along the axis of the atomic beam 4. There is further disposed a spectral device 14 comprising a Fabry-Perot multiple-wave interferometer 15 and a mirror-reflux monochromator 16 jointed by an achromatic objective lens 17. The focal plane of which is arranged on the entrance slit 18 (FIG. 2) of the monochromator 16.

The Fabry-Perot multiple-wave interferometer 15 (FIG. 1) has a thermal shield (not shown in the Figure), accommodating two parallel half-silvered flat mirrors 19 possessing high reflecting capacity and having a very low-absorption multiple-layer dielectric coating. In order to vary the distance between the mirrors 19 within a small range in the order of 1 micron, one of the mirrors 19 is provided with a holder 20 composed of three piezo-ceramic piles, each pile being fed with voltage. The inverse piezoelectric effect originating in the piezo-ceramic material, will change the length of holder 20.

Figure 3:
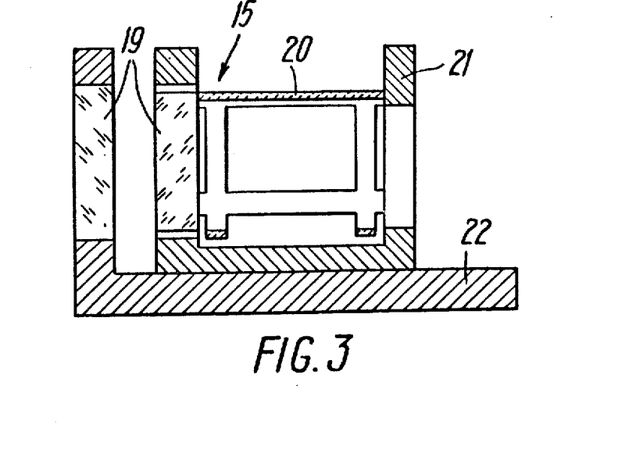
FIG. 3 is a longitudinal section of a Fabry-Perot interferometer, of the apparatus, according to the invention.

To effect coarse adjustment of the mirrors 19 (FIG. 3), a slide 21 is used to mount the mirrors 19 with the holder 20, said holder sliding along the surface of a carrier 22 with the help of a lead screw (not shown).

The luminous flux 2 (FIG. 2) is passing through the entrance slit 18 of the monochromator 16 strikes a prism 23 said prism having two mirror surfaces arranged so that after the luminous flux 2 is reflected by one of its mirror surfaces, said luminous flux strikes a parabolic mirror 24, in the focal plane of mirror the entrance slit 18 is arranged. A dispersion prism 25 is located on the path of the luminous flux 2 reflected by the mirror 24, said prism 25 decomposes the luminous flux 2 into a spectrum according to wave-lengths. Two mirrors 26 and 27 are disposed after prism 25 in such a way that the decomposed luminous flux 2, after being reflected by the mirror 26, strikes the mirror 27, and after being reflected by the latter, is returned onto the mirror 26, and again, being reflected by the latter, passes through the prism 25.

Figure 2:
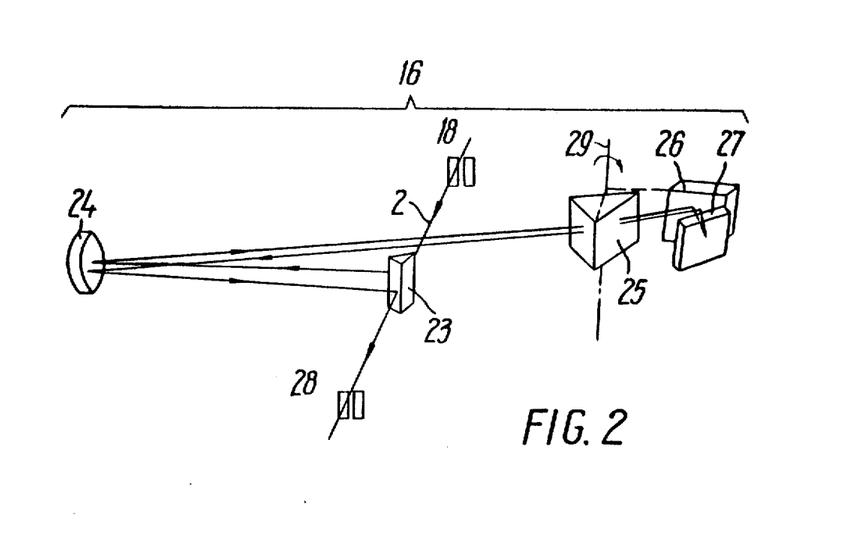
FIG. 2 is a schematic circuit diagram of a mirror-reflex monochromator, according to the invention.

The exit slit 28 of the monochromator 16 is arranged in the second focal plane of the prism 23.

The dispersion prism 25 and mirror 26 are mounted on a common support (not shown), by turning the latter around the axis 29, the wave-length of the spectrum decomposed by the prism 25 is adjusted.

With the help of an objective lens 30 located beyond the exit slit 28, said exit slit 28 of the monochromator 16 (FIG. 1) is projected, onto a plane 31, said plane 31 accommodating the slit 32 being adjusted as well as a changeable strip 33, forming two parallel slits which are normal to the image of the entrance slit 18 (FIG. 2) of the monochromator 16. The luminous flux 2 (FIG. 1), having passed through these slits and having been divided by them into two fluxes 2 strikes a mirror-edge prism 34 arranged beyond the plane 31, said prism directing the luminous fluxes 2 into two mutually opposite directions. One portion of the flux 2 is received by one photo detector, while the other portion is received by another photo detector. Both photo detectors in the embodiment described are photomultiplier cells 35 and 36, which transform the luminous flux 2 into an electric signal and amplify said signal.

The output of the photo-multiplier cell 35 is connected to the input of the current amplifier 37, which amplifies the signals derived from the photo-multiplier cell 35 within the range of from $3 \times 10^{-16.5}$ to $1 \times 10^{-16.12}$ A, having a pass-band of better than 30 mc.sec.

The output of the current amplifier 37 is connected, to the input of the second current amplifier 38 comprising a highly-stable d.c. compensator utilizing semiconductors and assembled according to a known diagram.

The output of the current amplifier 38 is connected to the holder 20 of the mirror 19 of the interferometer 15, ensuring thereby negative feedback in respect of the position of the interference pattern of the interferometer 15.

The output of the photo-multiplier cell 36 is connected to the input of the current amplifier 39. The latter comprises a transistorized double input stage (not shown), a differential operational amplifier, and an output transistorized stage which is coupled with a hundred percent negative feedback. The amplifier 39 also comprises an adjustable band-pass filter, including a high negative feedback amplifier with a high amplification ratio. The current amplification value of the amplifier 39 is variable in the range from $10^4$ to $10^{11}$ V/A, the pass-band being adjusted within 10 mc.sec. to 300 mc.sec.

The first output of the current amplifier 39 is connected to the input of an integrating digital voltmeter 40, utilizing semiconductors assembled according to a known diagram and connected to a recorder, being constructed in this embodiment of the invention as a digital recorder 41.

The other output of the current amplifier 39 is connected to the input of a synchronous detector 42.

The synchronous detector 42 employs semiconductors and integrated circuits and comprises a channel 43 (FIG. 4) of the signal being detected, a channel 44 of the control signal, a synchronous demodulator 45 and an amplifier 46 of the demodulated signal.

The channel 43 of the detected signal is an a.c. amplifier comprising input stages 47 assembled according to a known diagram and having a field-effect transistor and four series-connected operational amplifiers coupled by negative feedback. Between the output of the first operational amplifier and the input of the second amplifier a band-pass filter 48 is connected (represented as an individual unit for convenience), comprising a l.f. and h.f. portions incorporating integrated circuits, and an input operational amplifier tuned to the modulation frequency of the atomic beam 4 (FIG. 1). The output stages 47 (FIG. 4) of the a.c. amplifier are connected to the input stage 49 assembled according to a known diagram with two operational amplifiers, one of which amplifiers is connected as an inverting amplifier. The stage 49 ensures negative feedback in order to eliminate a zero drift.

Figure 4:
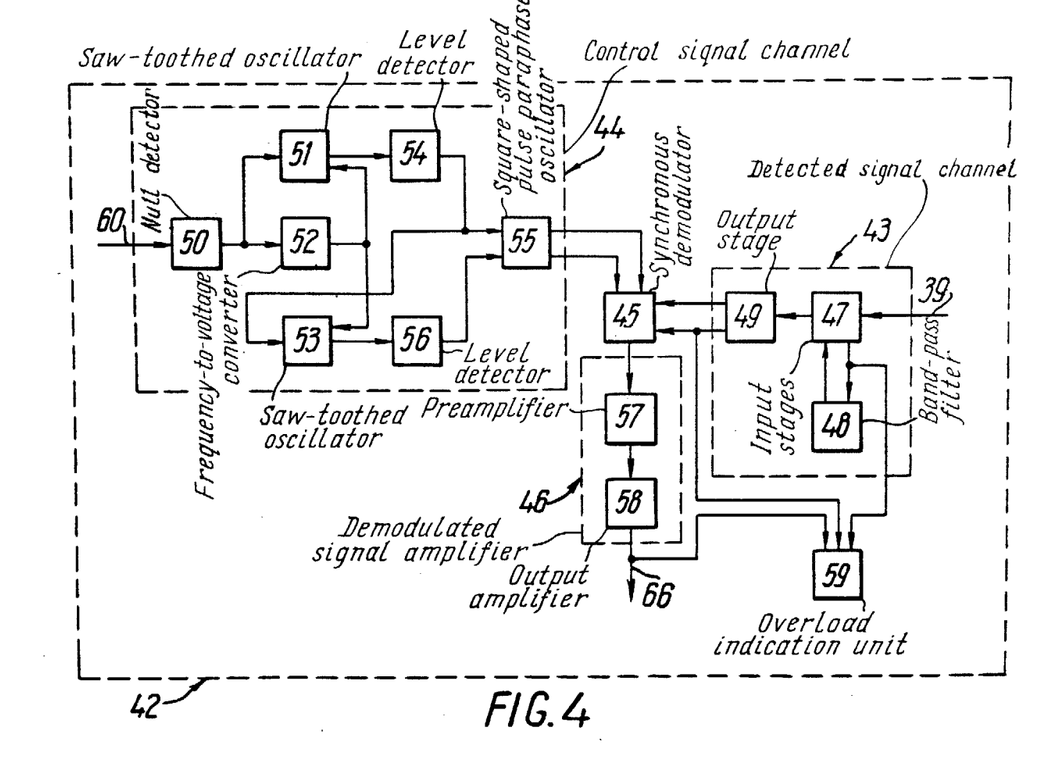
FIG. 4 is a block diagram of a synchronous detector, in the apparatus according to the invention.

Two amplified detected signals phase-shifted through 180° are obtainable from the output of hereinabove described a.c. amplifier.

The control signal channel 44 comprises a null detector 50 assembled according to a known diagram of a wide-band amplifier with a positive feedback, the output thereof being connected to an input of a saw-toothed oscillator 51 made as an integrator with a transistor switch, and to an input of a frequency-to-voltage converter 52 utilizing transistors and integrated circuits. The output of the converter 52 is connected to another input of the oscillator 51 and and to an input of another saw-toothed oscillator 53.

The ouput of the oscillator 51 is connected to the input of the level detector 54 utilizing semiconductors and integrated circuits, the output thereof being connected to an input of a paraphase square-shaped pulse oscillator 55 utilizing transistors and integrated circuits and to another input of the saw-toothed oscillator 53.

The output of the oscillator 53 is connected to an input of the level detector 56, the output thereof being connected to a second input of the paraphase square-shaped pulse oscillator 55.

Thus, the control signal channel 44 converts the periodically applied control signal of any shape into two paraphase square-shaped pulses.

The outputs of channels 43 and 44 are connected to two inputs of the synchronous demodulator 45 utilizing a simple circuit comprising two control field-effect transistors.

The output of the synchronous demodulator 45 is connected to the input of the demodulated signal amplifier 46 which amplifier comprises a pre-amplifier 57, assembled using a known diagram of a summator with a l.f. filter, and an ouput amplifier 58, assembled by using a known diagram and possessing a negative feedback and having an amplification switch.

The outputs of the first operational output stage a.c. amplifier 47, detected signal channel 43 and demodulated signal amplifier 46 are connected to a plurality of inputs of the overload indication unit 59, assembled by using a known diagram with double operational amplifier controlling the transistor operation, with a pilot lamp in the collector circuit thereof.

The circuit of the synchronous detector 42 described above makes possible to discriminate signals on a pure noise background exceeding the discriminated signal by $10^4$ to $10^7$ times.

Going to the other input of the synchronous detector 42 (FIG. 1) is a control pulse from the synchronizer 60, said synchronizer 60 and synchronizing detector 42, a storage circuit made in the present embodiment as a disc 61 fitted on the shaft 12 outside the vacuum chamber 5. The disc 61 has a plurality of holes 62, the location and quantity of which coincide with the holes 11 in the disc 10. The synchronizer 60 also has an incandescent lamp 63 and a photo-cell 64, which are arranged at both sides of the disc 61 so that the luminous flux emitted by the lamp 63 strikes the photo-cell 64 after passing through the hole 62.

The shaft 12 is driven by a synchronous motor 65 with a reducer.

The output of the synchronous detector 42 is connected to the input of an integrating digital voltmeter 66 which is connected to a digital recorder 67.

Another embodiment of the invention is possible similar to that hereinabove described.

It differs from the above-described in that the interferometer 15 (FIG. 5 without the thermal shield) is arranged inside the vacuum chamber 5 and its mirrors 19 are located in parallel to the axis of the atomic beam, embracing the latter completely.

In this case the carrier 22 (FIG. 3) is provided with a hole (not shown) for a free passage of the atomic beam 4.

With such an arrangement of the interferometer 15, the lens 3 (FIG. 1) becomes unnecessary. Directly beyond the source of light 1 (FIG. 5) an objective lens 13 is mounted, in whose focal plane the source 1 is arranged. Hereat, the achromatic objective lens 17, similarly to the principal embodiment hereinabove described, joins the interferometer 15 with the monochromator 16.

Figure 5:
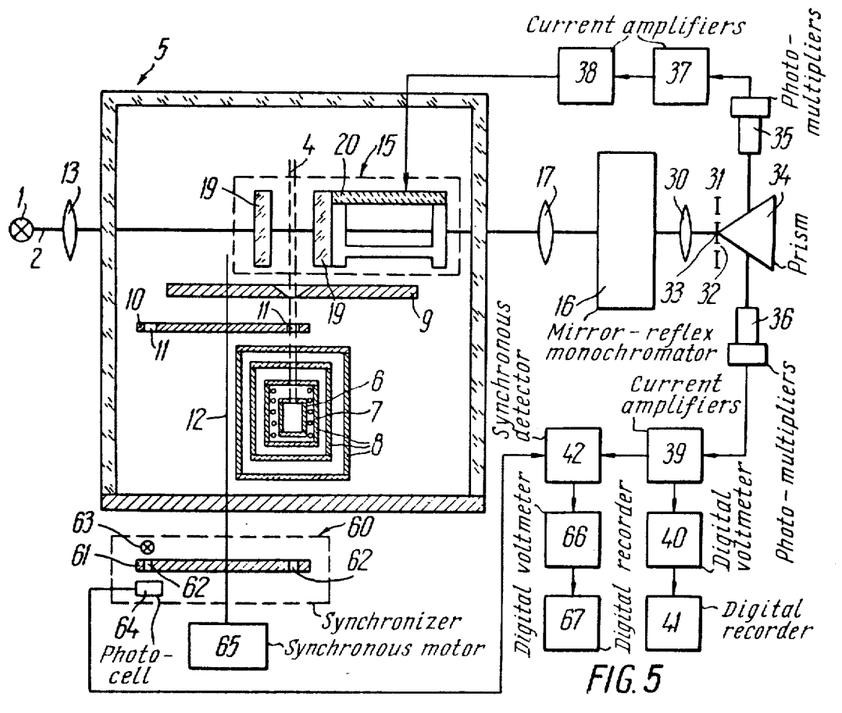
FIG. 5 is another embodiment of the apparatus according to the invention.

In order to ensure proper matching of geometric dimensions of the atomic beam 4 and luminous flux 2 at the point of their intercross, the objective lens 13 is preferably installed so that the source of light 4 is imaged on the axis of the atomic beam 4.

In an embodiment of the invention incorporating the interferometer 15 inside the vacuum chamber 5, the usage of spherical mirrors is reasonable, making it possible to match advantageously the geometric dimensions of the atomic beam 4 and luminous flux 2 thereby increases the ratio of the useful signal to noise.

As the source of light in both embodiments a powerful source may be advantageously used, such as a laser beam with a variable wave-length which makes it possible to increase considerably the signal-to-noise ratio.

Another embodiment of the invention is possible which uses the radiation of an excited atomic beam of the substance involved as a source of light with a line spectrum. The width of the radiation line of this source coincides with that of an absorption line of the substance involved due to similar parameters of the atomic beams of the source and the substance. This embodiment makes it possible to use one monochromator or interference filter for isolation of the spectrum section.

The device realizing the method of measurement of the concentration of substance in its gaseous phase hereinabove described operates as follows:

The effusion cell 6 (FIG. 1) is charged with some quantity of $Cd$, the thermal shields 8 are installed, and the chamber 5 is evacuated to a vacuum of the order of $1 \times 10^{116.6}$ mm Hg. At the same time preliminary adjustment of the mirrors 19 of the interferometer 15 is effected, which consists in varying the distance there between with the help of a lead screw allowing the mirror 19 with the holder 20 (FIG. 3) to be displaced along the plane of the carrier 22 relative to another mirror 19 fixed rigidly on the carrier 22. The distance between the mirrors 19 is selected by taking into account the resolution of the interferometer 15 which makes it possible to isolate the radiation spectrum section of the source 1 (FIG. 1) including the whole absorption line of $Cd$. A voltage of a certain magnitude is applied to each of the three piezo-ceramic piles in order to adjust parallelism of the mirrors 19.

Then a changeable strip 33 of a certain width is inserted into the slit 32 being adjusted, in order to obtain two slits in the plane 31, the dimensions of which make possible to isolate two sections from the radiation line including complete absorption line of $Cd$. The distance between the centers of the slits should be such that in isolating one of the two slits of the section in the region of the apex of $Cd$ radiation line the other should isolate this section in the region of approximately the middle of the wing of this radiation line.

Once the rated pressure in the vacuum chamber 5 is achieved, the spiral 7 of the effusion cell 6 is energized and $Cd$ will evaporate at a temperature determined by the density of $Cd$ atoms flux emitting from the hole of the cell 6. Under the action of the system of collimating diaphragms, the $Cd$ atoms flux is formed into a beam 4 of a definite aperture. Then the synchronous motor 65 is energized to rotate the discs 10 and 61.

At the moment of coincidence of the hole 11 in the disc 10 with the axis of the beam 4, the latter passes freely through the disc. At the same time through the hole 62 of the disc 61 a luminous flux emitted by the lamp 63 is passed, which is converted by the photo-cell 64 into an electric signal applied to the synchronous detector 42.

The atomic beam 4 is interrupted at the instant the hole 11 of the disc 10 fails to coincide with the axis of the beam 4. The diameter of holes 62 in the disc 61 are less than that of the holes 11, with the aim of preventing the initiation of a signal in case of incomplete interruption of the atomic beam 4 by the disc 10.

In interrupting the atomic beam 4 no signal is sent from the synchronizer 60 to the synchronous detector 42.

The liminous flux 2 emitted by the source of light 1 is condensed by the lens 3 located on the axis of the beam 4.

At the instant the atomic beam 4 interferes with the path of the luminous flux 2 constantly passing through the vacuum chamber 5, the atoms of the beam 4 absorb a portion of radiation emitted by the source of light 1. Further, the partially absorbed flux 2 is formed by the objective lens 13 into a parallel flux striking the mirrors 19 of the interferometer 15. After a multiple reflection from the mirrors 19, an interference pattern is obtained which is imaged by the achromatic objective lens 17 on the entrance slit 18 (FIG. 2) of the monochromator 16.

The entrance slit 18 cuts out a strip from the central portion of the interference pattern, the liminous flux of which strikes the parabolic mirror 24 after being reflected by one of the mirror surfaces of the prism 23. The flux reflected by the mirror 24 hits the dispersion prism 25 in form of a parallel luminous bunch. After being dispersed into a spectrum and reflected by the mirror 26, the luminous flux strikes the mirror 27 and is reflected by it, thereby striking again the mirror 26. In reflecting from the latter the flux passes again through the prism 25.

The luminous flux decomposed into spectrum is collected by the parabolic mirror 24 on the exit slit 28, having been first reflected by another mirror surface of the prism 23.

By turning the prism 25 together with the mirror 26 around the axis 29, the monochromator 16 is adjusted to a Cd radiation wave-length.

Thus, the exit slit 28 cuts out a strip from the central portion of the interference pattern corresponding to the Cd radiation wave-length.

The luminous flux passing through the exit slit 28 of the monochromator 16 is collected by the objective lens 30 (FIG. 1) in the plane 31 so that the exit slit 28 (FIG. 2) is imaged on the plane 31 (FIG. 1), multiplied two-fold for convenience of working with the slits perpendicular to the exit slit 28 (FIG. 2) and formed by introducing the changeable strip 33 into the slit 32 (FIG. 1). Said slits cut out of the interference pattern image in the plane 31 two strips around the interference pattern center. One of the isolated strips corresponds to the apex of Cd radiation line and includes the whole radiation line of Cd (the center of the absorption line for cadmium coincides with the radiation line centre). The other isolated strip corresponds approximately to the middle of the Cd radiation line wing.

The luminous flux from the isolated strip corresponding to about the middle of the Cd radiation line wing is directed by the prism 34 onto the photo-cathode of the photo-multiplier cell 35. The latter converts the luminous flux into an electric signal preamplified by the current amplifier 37. The amplified electric signal is applied to the second current amplifier 38 having a highly stable compensator.

The electric signal, after being amplified and completely compensated, is applied to the piezo-ceramic piles of the holder 20 used for adjusting the interferometer 15, whereat one of the isolated strips should correspond to the apex of the Cd radiation line. An adjustment is effected by varying the basic voltage applied to the piles.

The distance between the mirrors 19 of the interferometer 15 is altered by the transverse piezoelectric effect, which allows for Cd radiation line to be scanned.

A principal disadvantage of scanning by means of piezo-ceramic material is the high sensitivity of the piezo-ceramic piles to the ambient temperature fluctuations, which causes a displacement of the interference pattern. With an aim of precluding it, a feed-back was introduced, which feed-back is effected by applying auxiliary voltage to the piezo-ceramic piles that are in series with the main voltage supply for stabilizing the Cd radiation line center.

In case of a Cd radiation line centre drift, an auxiliary electric signal is initiated across the output of the current amplifier 38, which influences the piezo-ceramic piles so that the interference pattern is returned in its initial position.

The luminous flux from the isolated strip, corresponding to the Cd radiation line apex is directed by the prism 34 onto the photo-cathode of the photo-multiplier cell 36. The latter converts the flux into an electric signal stabilized by the negative feedback according to position of the interference pattern. The electric signal passes through the current amplifier 39 and is applied across the input of the synchronous detector 42, being simultaneously registered by the digital voltmeter 40 and digital recorder 41.

As it has been described above, a signal, produced by the synchronizer 60 at the instant a portion of radiation of the source of light 1 is absorbed by the atomic beam 4 is applied across the other input of the synchronous detector 42.

By interrupting periodically the atomic beam 4, an electric signal is obtainable across the input of the synchronous detector 42, comprising an alternating component corresponding to the alteration of the luminous flux 2 due to its partial and periodical absorption by the atomic beam 4. Across the other input of the detector 42 is periodically applied an electric signal produced by the synchronizer 60 having a frequency of interruption of the atomic beam 4.

Further, the alternating component of the electric signal is repeatedly accumulated by means of detector 42 in synchronism with the interruption of the atomic beam 4, increasing thereby the portion of useful signal in noise.

The electrically detected signal, comprising the alternating component produced by the current amplifier 39 and having a magnitude which is amplified by the input stages 47 (FIG. 4) of the a.c. amplifier; and a frequency band including the atomic beam 4 (FIG. 1) interruption frequency is cut out from the amplifier frequency spectrum by means of the filter 48, the magnitude of the signal a.c. component being practically stable. The output stages 48 of the a.c. amplifier convert the amplified and detected signal into two detected signals, phase-shifted through 180°. Further both signals are applied across the input of the synchronous demodulator 45.

For detecting the electrical signal in synchronism with the interruption of the atomic beam 4, an electrical signal produced by the synchronizer 60 (FIG. 4) and coverted by the control signal channel 44 is applied across the other input of the demodulator 45.

The control signal obtained from the synchronizer 60 is applied to the null detector 50 which amplifies the signal and converts it into pulses of a certain magnitude. Pulses derived from the output of the detector 50 are applied at the same time across the inputs of the saw-toothed oscillator 51 and frequency-to-voltage converter 52. Hereat saw-toothed pulses are generated across the output of the oscillator 51, each point of the leading edge of which corresponds to a definite phase of the control signal. From the output of the converter 52 a voltage is obtained, the magnitude of which is proportional to the control signal frequency. This voltage is applied across the second input of the oscillator 51 thereby changing the speed of build-up of the saw-toothed pulse voltage.

The pulse from the output of the oscillator 51 are applied across the input of the level detector 54 which operates as the voltage of the linearly increasing portion of the pulse obtains a definite value, being proportional to the control signal phase. Now a pulse is produced across the output of the detector 54, the time of its generation corresponding to the control signal phase which triggers paraphase square-pulse oscillator 55 and saw-toothed oscillator 53. A voltage is applied across the other input of the oscillator 53 derived from the converter 52 and is simultaneously impressed across the oscillator 51, both oscillators operating in the single-shot duty and with the saw-toothed voltage decaying as it obtains the rated value.

From the output of the oscillator 53 the pulses are applied across the input of the level detector 56 which produces a pulse for driving the oscillator 55 similarly to that obtained from detector 54.

Thus across the input of the oscillator 55 two similar pulses are applied the pulse being shifted in time by a value corresponding to an alteration of the control signal phase through 180°. Two paraphase square-shaped pulses are obtainable from the output of the oscillator 55 which are further applied across the input of the synchronous demodulator 45. The latter will pass the detected signal provided its phase coincides with that of the control signal.

The demodulated electric signal, derived from the demodulator 45 output is amplified by the preamplifier 57 and from its frequency spectrum neighbouring the zero frequency band, is isolated, the magnitude of which is set according to the signal-to-noise ratio. Then the demodulated signal is amplified by the output amplifier 58.

For recording the overloads in the input stage 47 and output stages 49 of the a.c. amplifier and in output amplifier 58, which overloads cause the distortion of the detected signal magnitude, overload indication unit 59 is provided.

Thus, an electrically constant signal is obtained from the output of the synchronous detector 42, the magnitude of which is proportional to the a.c. component amplitude of the detected signal which is recorded by the digital voltmeter 66 (FIG. 1) and digital recorder 67.

Further, the ratio of the stored a.c. component of the electric signal to the signal corresponding to the luminous flux 2 which passed through the vacuum chamber 5 without being absorbed is determined, said ratio being proportional to the Cd concentration in its gaseous phase.

The concentration of atoms in the atomic beam of the substance being investigated according to the magnitudes of measured a.c. components of electric signal ($J_o - J$) and its magnitude $J_o$ corresponding to the luminous flux passed without absorption are calculated according to equation:

$$N = \Delta \nu \, J_o - J/J_o \times m \times c/J_1 \times l^2 \times l \times f \times a \qquad (1),$$

where $\Delta \nu$ is the isolated section of continuous radiation spectrum including the whole absorption line. In case of a line radiation spectrum source, $\Delta \nu$ should be considerably less than the radiation line width, which is feasible in an atomic beam absorption; $l$ is the atomic beam width at the point where the luminous flux passes through it;

$f$ is the oscillator force;

$m$, $e$ are the mass and charge of electron;

$C$ is the universal constant equal to $3 \times 10^{10}$ cm/sec;

$a$ is the distribution of isotope used in the source of light.

The equation (1) is true with small optical densities, i.e. small product of the coefficient of light absorption $K_v$ by the absorption layer length 1 ($K_v \times 1 < 1$), which is always feasible when the absorption is in the atomic beam.

In exciting the atomic beam before the luminous flux is passed for measuring the concentration of a substance having a complex absorption spectrum in a non-excited state, it should be taken into account in equation (1) that the value $N$ will represent the concentration of excited atoms in the atomic beam. In order to calculate the concentration of initial neutral atoms in the atomic beam, it is necessary to know the cross-section of the reaction bringing the atoms into the excited state and the parameters of reagents involved. For instance, when using a monoenergetic atomic beam for exciting the atoms in said atomic beam, it shall be necessary to know the cross-section of excitation of atoms with electronic blow at a given electron energy, the current density of the bombarding electrons, the velocity of atoms investigated and the height of electronic beam (for metastable levels). The excited cross-section of atoms with electronic blow have been theretofore measured with an accuracy of 10 to 15 percent. This data can be obtained if unavailable for the elements involved.

All of the other necessary data are determined directly in the process of measurement of the concentration of atoms in the atomic beam.

In the other embodiment of the invention the luminous flux 2 (FIG. 5) is collected by the objective lens 13 on the axis of the atomic beam 4 after passing through one of the mirrors 19 of the interferometer 15.

After a multiple reflection of the luminous flux 2 by the mirrors 19, (the flux 2 is at the same time repeatedly absorbed by the atomic beam 4 as the latter arises) an interference pattern is obtained which is imaged by the achromatic objective lens 17 onto the entrance slit 18 (FIG. 2) of the monochromator 16 similarly with the principal embodiment of the device.

It shall be noted that in equation (1) for calculation of the concentration an increase in the absorption length $1'$ shall be taken into account due to the repeated passage of the luminous flux through the atomic beam. For this version $l' = b \times 1$, where $l$ is the atomic beam width; $b$ is the ratio of flux passing through the beam which depends on the reflection factor of mirrors.

For calculating the maximum sensitivity of determination of Cd atoms concentration in the atomic beam according to the present invention, it shall be necessary to estimate optimum possible ratings of values of the equation (1). The radiation spectrum section $\Delta \nu$ to be isolated should be taken approximately equal to 4 $\Delta \nu n$, where $\Delta \nu n$ is the absorption line width depending on the Cd evaporation temperature and on the atomic beam aperture. With the beam properly collimated, $\Delta \nu n$ can be equal to $410^{-3}$cm$^{-1}$ for resonant line of Cd 2288 A. The oscillator force of this line should be $f = 1.2$. The atomic beam width $l = 4$ cm on condition of the proper beam collimation can be obtained, for example, by using a multichannel system of diaphragms. The ratio $J_o - J/J_o$ can be measured rather precisely up to $10^{-2}$ percent using a synchronous detector.

Substituting these values in equation (1), we obtain $N = 5 \times 10^5$ at/cm$^3$.

With the second embodiment of the invention, the minimum measured concentration can be reduced by $b = 1'/1$ times due to multiple passing of the luminous flux through the atomic beam. Taking into account the modern interferometric mirror manufacturing techniques, the value of $b = 50$ is quite real, however, the beam width 1 should be reduced four times for varying the distance between the interferometer mirrors over a wide range, with $N = 5 \times 10^4$ at/cm$^3$.

The method according to the present invention permits absolute measurements of atom concentration in the atomic beam of the substance involved to be taken, ie., preliminary calibration of the device to samples of known composition is not required before use. In this case the limit sensitivity of the method involved is of several orders higher than that of known methods.

The apparatus for embodying the method of measurement of concentration of the substance in its gaseous phase allows, in general, a definite combination of known electronic and optical instruments.

The use of the atomic beam as an absorption layer provides for a considerable increase in the measurement accuracy.

The introduction of a modulator of the atomic beam and an electric signal storage makes possible to increase considerably the signal-to-noise ratio.

By using the method according to this invention and the apparatus for effecting same, the concentration of impurities in super-pure materials can be measured, for instance, by evaporating completely the impurity within a fixed period of time.

What is claimed is:

1. A method of measuring the concentration of a substance in its gaseous phase, said method comprising the steps of: continuously passing a luminous flux emitted by a source of light through a target containing the substance being measured in its gaseous phase, the substance being disposed in said target as a periodically interrupted atomic beam; absorbing by said atomic beam a portion of radiation emitted by said luminous flux each time said atomic beam interferes with said flux, thereby generating an alternating component of said luminous flux; passing said luminous flux without absorption; isolating a radiation spectrum section of said source of light including the whole absorption line of the substance involved; converting the luminous flux corresponding to said isolated spectrum section into an electric signal; repeatedly storing the alternating component of the electric signal in synchronism with the interruption of said atomic beam, thereby increasing the portion of useful signal in noise; and determining the ratio of said electric signal to a signal corresponding to the luminous flux passed through said target without being absorbed, proportional to the concentration of the substance being measured in its gaseous phase.

2. A method as claimed in claim 1, wherein before passing the luminous flux through said atomic beam, the atoms of the latter are brought into excited electron state for measuring the concentration of a substance having a complex absorption spectrum in non-excited state.

3. An apparatus for measuring the concentration of the substance in its gaseous phase, said apparatus comprising a source of light; a vacuum chamber, said chamber being disposed on the path of the luminous flux emitted by said source of light; a system of collimating diaphragms of said vacuum chamber accommodated inside and serving to form an atomic beam from the gaseous phase of the substance involved, placed inside said vacuum chamber; a means for interrupting said atomic beam in said vacuum chamber, located relative to said chamber so that the interruption of said atomic beam is ensured; a spectral instrument for isolating from the radiation spectrum of said source of light a section comparable with the absorption line of said atomic beam, disposed on the path of the luminous flux emitted by said source of light; a photo detector means located on the luminous flux path for converting the flux of said isolated radiation spectrum section into an electric signal; a storage system means for electrical signals electrically coupled with said photo detector increasing the portion of useful signal in noise; and a recorder of electrical signals electrically coupled with said storage system means.

4. An apparatus as claimed in claim 3, wherein said storage system means is provided with a synchronous detector and a synchronizer, the input of said detector being electrically coupled with the output of said photo detector, said synchronizer being connected between another output of said detector and said above-described means for interrupting said atomic beam.

5. An apparatus as claimed in claim 3, wherein said spectral instrument is provided with a multiple-wave interferometer, said interferometer being made as two parallel half-silvered mirrors, and a monochromator installed along the luminous flux path.

6. An apparatus as claimed in claim 4, wherein said spectral instrument is provided with a multiple-wave interferometer said interferometer being made as two parallel half-silvered mirrors, and a monochromator installed along the luminous flux path.

7. An apparatus as claimed in claim 5, wherein said multiplewave interferometer is disposed inside said vacuum chamber and said half-silvered mirrors thereof are arranged substantially parallel to the axis of said atomic beam inside said vacuum chamber and embrace said beam.

8. An apparatus as claimed in claim 3, wherein to provide the absorption line of the substance measured having an isotope structure, said source of light is provided with a line radiation spectrum from an even isotope of the substance involved arranged inside.

9. An apparatus as claimed in claim 4, wherein to provide the absorption line of the substance measured having an isotope structure, said source of light is provided with a line radiation spectrum from an even isotope of the substance involved arranged inside.

10. An apparatus as claimed in claim 5, wherein to provide the absorption line of the substance measured having an isotope structure, said source of light is provided with a line radiation spectrum from an even isotope of the substance involved arranged inside.

* * * * *